US009904673B2

(12) United States Patent
Janakiraman et al.

(10) Patent No.: US 9,904,673 B2
(45) Date of Patent: Feb. 27, 2018

(54) CONVERSATION ADVISOR

(71) Applicant: International Business Machines Corporation, Armonk, NY (US)

(72) Inventors: Janani Janakiraman, Austin, TX (US); Megan D. Kostick, Edmonds, WA (US); Dany R. Madden, Beaverton, OR (US); Meenakshi Sripal, Saint Louis, MO (US); Wendel G. Voigt, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 309 days.

(21) Appl. No.: 14/573,647

(22) Filed: Dec. 17, 2014

(65) Prior Publication Data
US 2016/0182410 A1    Jun. 23, 2016

(51) Int. Cl.
*G06F 15/16* (2006.01)
*G06F 17/27* (2006.01)
*H04L 12/58* (2006.01)

(52) U.S. Cl.
CPC ........ *G06F 17/2785* (2013.01); *H04L 51/063* (2013.01)

(58) Field of Classification Search
None
See application file for complete search history.

(56) References Cited

U.S. PATENT DOCUMENTS

| | | | |
|---|---|---|---|
| 6,247,065 B1 | 6/2001 | Greenspan et al. | |
| 7,761,524 B2 | 7/2010 | Carmel et al. | |
| 7,890,860 B1 | 2/2011 | Thrasher et al. | |
| 8,301,707 B1 | 10/2012 | Hebb et al. | |
| 2010/0223341 A1* | 9/2010 | Manolescu | G06F 17/30905 709/206 |
| 2012/0158860 A1 | 6/2012 | Chakra et al. | |
| 2014/0122622 A1* | 5/2014 | Castera | H04L 51/32 709/206 |
| 2014/0201296 A1* | 7/2014 | Patfield | H04L 51/04 709/206 |
| 2015/0143255 A1* | 5/2015 | Agrawal | H04L 51/28 715/752 |

* cited by examiner

*Primary Examiner* — John B Walsh
(74) *Attorney, Agent, or Firm* — Walter W. Duft

(57) ABSTRACT

A method, system and computer program product for assisting the authoring of electronic messages are disclosed. Operations performed according to an example embodiment may include:
- accessing an electronic message stored in digital form in a computer memory;
- inspecting the electronic message to identify intended recipients of the electronic message;
- gathering and analyzing historical data stored in digital form in a computer memory relating to a conversation history that links an author of the electronic message to the intended recipients;
- performing semantic analysis on the electronic message to extract words and phrases representing recipient fitness information that is indicative of whether the electronic message is appropriate for the intended recipients;
- generating a fitness result for the electronic message by comparing the recipient fitness information to the historical data and identifying inconsistencies; and
- outputting the fitness result for viewing on an electronic display device associated with the author of the electronic message.

20 Claims, 5 Drawing Sheets

| Susan Queue Database Entry (36) ||
|---|---|
| Key | 1022 |
| Name | Susan Queue |
| Email Address | susanq@email.com |
| Nicknames | Susie, Sue, SQ, . . . . |
| Gender | Female |
| # of Connections Made | 537 |
| Company | ABC Corp. |
| Work Position | Software Engineer |
| Relationship | Co-worker, Friend |

36-2
36-4
36-6
36-8
36-10
36-12
36-14
36-16
36-18

CONVERSATION ADVISOR

BACKGROUND

1. Field

The present disclosure relates to information exchange using electronic messaging technologies, such as email messaging, text/chat messaging, messaging functionality within social media applications, etc. More particularly, the disclosure is directed to automated techniques for the authoring of electronic messages.

2. Description of the Prior Art

By way of background, users of electronic messaging applications often exchange messages with many different individuals and/or groups of individuals. Such communications usually occur within the context of separate conversation threads dealing with particular subjects of mutual interest. Depending on the number of message conversations that a given user engages in, it is fairly easy for such a user to make mistakes when preparing or responding to particular messages. Such mistakes may include (1) accidentally sending a message to an unintended individual or group recipient, (2) identifying a message recipient improperly within the message itself, such as by using an incorrect or inconsistent name, title, salutation or pronoun descriptor, or (3) using language that is inappropriate for a particular message recipient.

The present disclosure provides an electronic message authoring tool for helping users avoid making message authoring mistakes such as those mentioned above.

SUMMARY

A method, system and computer program product for assisting the authoring of electronic messages are respectively disclosed. Operations performed in accordance with an example embodiment may include:

accessing an electronic message stored in digital form in a computer memory;

inspecting the electronic message to identify intended recipients of the electronic message;

gathering and analyzing historical data stored in digital form in a computer memory relating to a conversation history that links an author of the electronic message to the intended recipients;

performing semantic analysis on said electronic message to extract words and phrases representing recipient fitness information that is indicative of whether the electronic message is appropriate for the intended recipients;

generating a fitness result for said electronic message by comparing the recipient fitness information to the historical data and identifying inconsistencies; and outputting said fitness result for viewing on an electronic display device associated with the author of the electronic message.

BRIEF DESCRIPTION OF THE DRAWINGS

The foregoing and other features and advantages will be apparent from the following more particular description of example embodiments, as illustrated in the accompanying figures.

DETAILED DESCRIPTION OF EXAMPLE EMBODIMENTS

Figure 1:
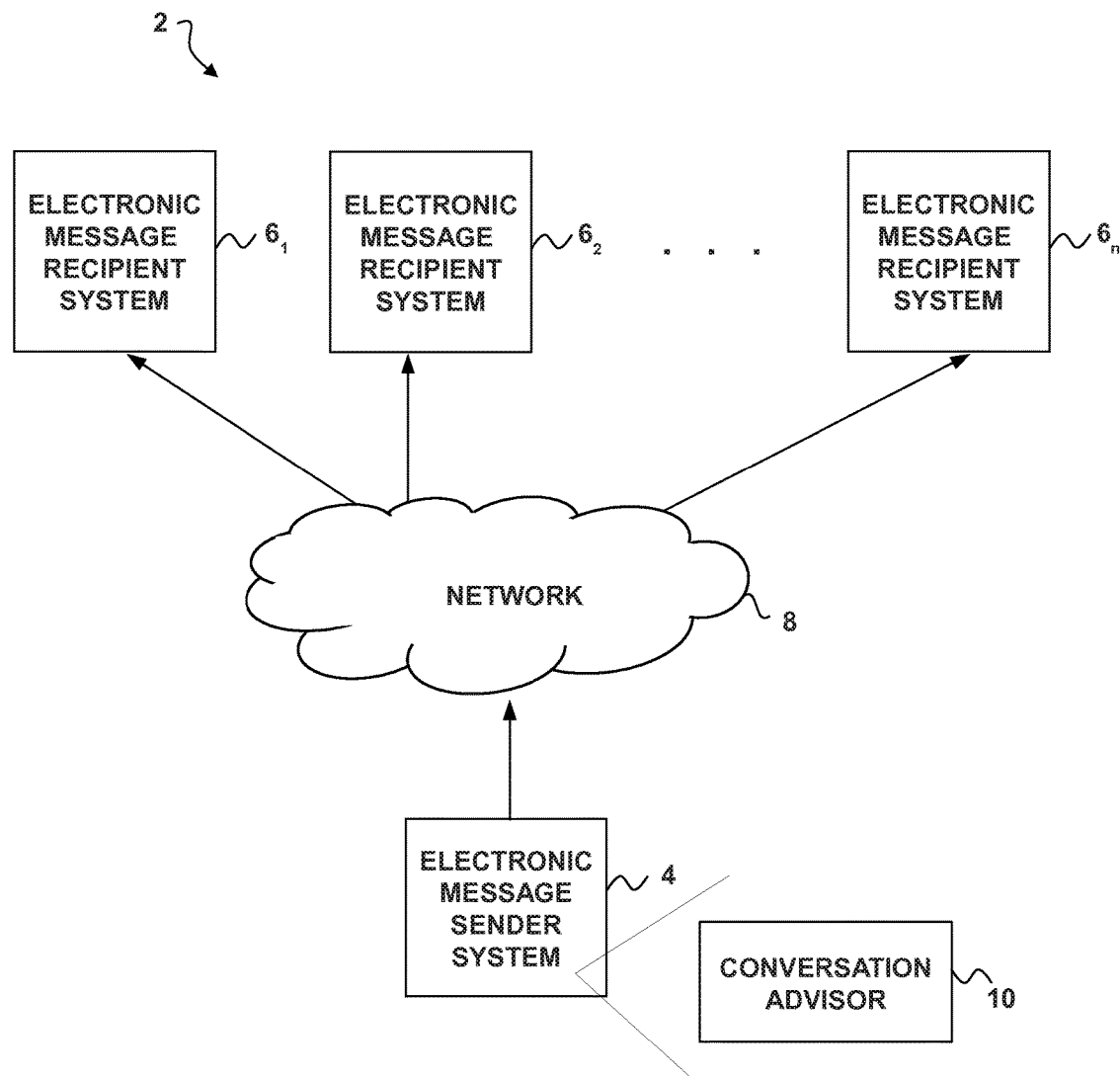
FIG. 1 is a functional block diagram showing an example electronic messaging environment.

Disclosed herein is a conversation advisor tool that proof reads and advises authors of electronic messages so that it is easier to compose messages in a consistent manner that is appropriate for intended recipients. The conversation advisor relies on semantic analysis of the electronic message, together with analysis of historic data based on conversations that the author of the electronic message has had with the recipient(s) in the past. Based on these analyses, the conversation advisor provides advice to the author to identify problem language and optionally offer suggested alternatives. The advice may cover such matters as the (1), the tone of the message based on whether the message is directed to a single recipient or a group of recipients, (2) the manner in which the recipients are addressed in a message salutation (e.g., Mr., Ms, Dr., Dear, Hello Team, addressing by nicknames, etc.), (3) the gender of the recipient(s) and the appropriate use of gender specific pronouns and nouns, (4) the use of proper names and nicknames for the recipients, and (5) whether the level of formality of the messages properly befits the recipient(s) (e.g., to prevent the use of inappropriately casual or overly formal language).

The conversation advisor tool evaluates the history of electronic messages between the author and the intended recipient(s) of the current electronic message in order to suggest what parameters the electronic message author should follow. The historical data is not limited to conversations in a particular environment (e.g., email), but may include many different types of messaging environments (e.g., email, chat, social media, etc.).

For example, if the author is composing an email message to Mary, and has saved chat histories with the same Mary, information from the chat sessions can be used to mine for historical information such as the gender of Mary and the author's relation to Mary. If it is determined that the author has a personal relationship with Mary, the author should be free to express his/her feelings, and the conversation advisor need not restrict the language usage. On the other hand, if the recipients are Mary and a company's technical board mailing list, then a stricter language rule can be enforced to ensure the message is appropriate for all audiences. Similar, if the recipients are Mary and the CEO of a company, then the stricter language rule can also be enforced.

The conversation advisor can be invoked at any time during the authoring of an electronic message, or can run continuously as the message is being typed. Problematic language in the message can be highlighted on the author's display device, and alternative language can be suggested. The conversation advisor may also include a learning component that learns from the actions taken by the author in response to the advice. Thus, if the electronic message author decides to reject the advice, the conversation advisor can take note and make an appropriate update the historical data associated with the message recipient(s).

Turning now to the figures, wherein like reference numerals represent like elements in all of the several views, FIG. 1 illustrates an example electronic messaging environment 2 in which electronic message authoring assistance may be practiced according to example embodiments disclosed herein. In the electronic messaging environment 2, an electronic message sender system 4 implements one or more electronic messaging applications that may be invoked by a system user (not shown) for the purpose of authoring electronic messages. This system user is an electronic message author. The electronic message author uses the electronic message sender system 4 to prepare and send electronic messages to one or more electronic message recipient systems 6, each of which is associated with a system user (not shown) representing an electronic message recipient. In FIG. 1, several electronic message recipient systems $6_1$, $6_2$ . . . $6_n$ are shown. Each electronic message recipient system 6 implements one or more of the same electronic message applications as the electronic message sender system. By way of example only, such electronic message applications may include email messaging applications, text/chat messaging applications, social media applications with messaging capability, etc. Any suitable communication infrastructure, such as a wireline or wireless network 8, may be used to provide the necessary communication pathways that interlink the aforementioned electronic message sender and recipient systems 4 and 6. Examples of such communication infrastructure include, but are not limited to, private networks, public networks, virtual private networks, or combinations of the foregoing.

The electronic message sender and recipient systems 4 and 6 may embody any intelligent device, system or appliance of any convenient form that is capable of interacting with a user and implementing programmable (or dedicated) electronic messaging logic for sending and receiving electronic messages. Example implementations of the electronic message sender and recipient systems 4 and 6 include electronic messaging logic executed by a mainframe, midrange or workstation computer, a personal desktop computer, a laptop computer, a cellular telephone or other handheld device, a web appliance or other embedded system, a virtual machine, etc., all of which represent examples of possible electronic message sender and recipient systems.

Although not shown, it should be understood that for many types of electronic messaging applications, communication between the electronic message sender system 4 and the electronic message recipient systems 6 will involve one or more intermediary server systems. Examples include email servers, text/chat servers and social media servers. The operations of such server systems are conventional in nature, and in the interest of brevity will not be described further herein.

The electronic messaging authoring assistance technique disclosed herein is implemented by the electronic message sender system 4, and may additionally be implemented by the electronic message recipient systems 6 insofar as such systems will usually also be used for the authoring and sending of electronic messages. The functional logic that supports the disclosed electronic message authoring technique will be referred to hereinafter as a conversation advisor, and will be designated by reference number 10.

Figure 2:
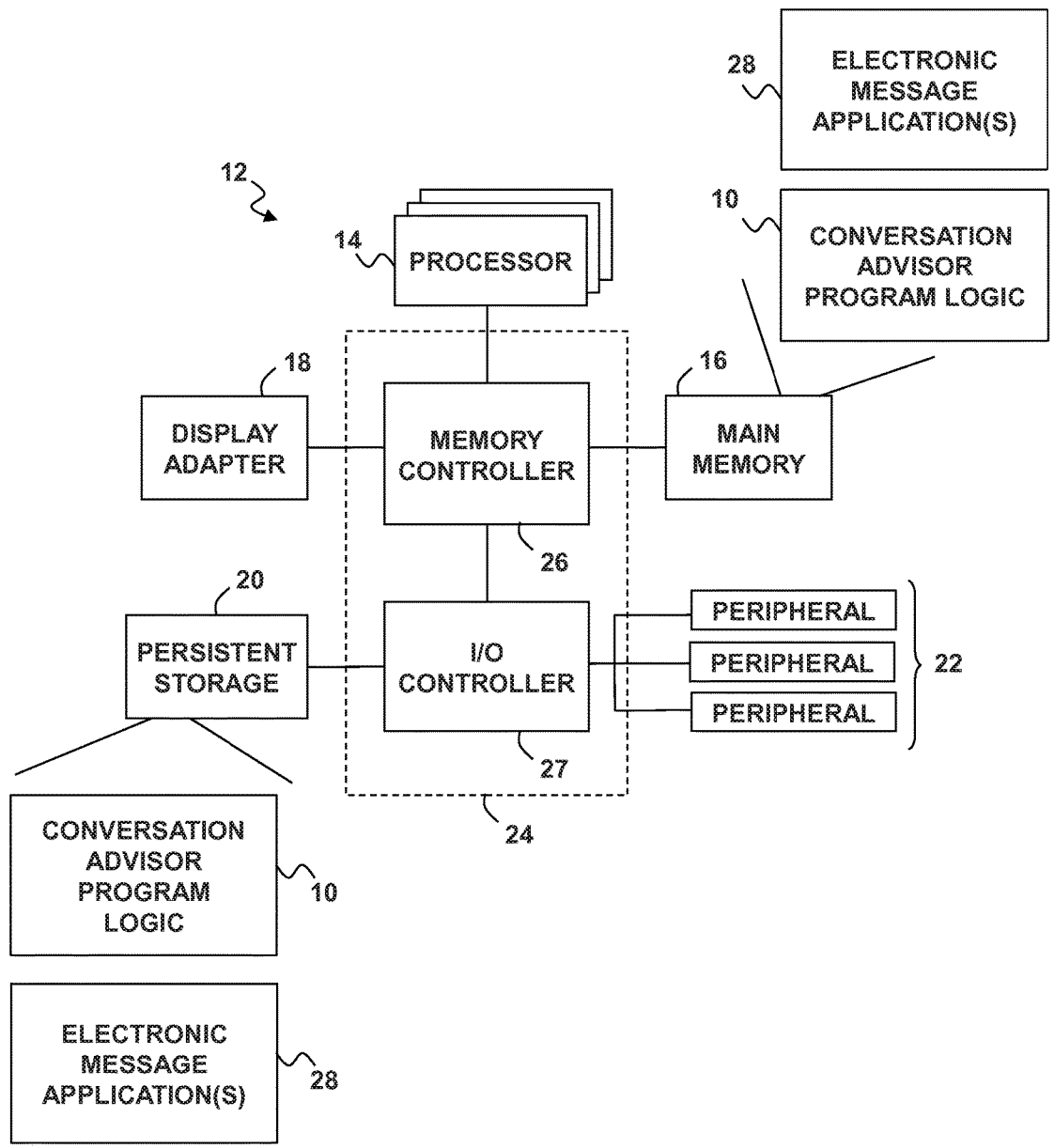
FIG. 2 is a functional block diagram showing an example computer system that may be used for assisting the authoring of electronic messages.

Turning now to FIG. 2, an example computing system 12 is shown that may be used to implement the conversation advisor 10 in the electronic message sender system 4 of FIG. 1, as well as in any of the electronic message recipient systems 6 of FIG. 1. The computing system 12 supports execution of the conversation advisor 10 as computer program logic that in turn controls the computing system 12 to perform various electronic message authoring support operations, to be described in more detail below. According to one possible embodiment, the computing system 12 may include one or more processors 14 that operate in conjunction with a main memory 16. As used herein, the term "processors" includes, but is not necessarily limited to, single-threaded or multi-threaded CPUs (Central Processing Units) within single-core or multi-core processor devices (each core being considered a CPU) that are designed to execute program instruction logic, such as software or firmware. The processors 14 may include general purpose processors or they may be custom-designed to support the required functions. The memory 16 may include RAM (Random Access Memory), ROM (Read-Only Memory), combinations of RAM and ROM, or any other type of tangible storage medium capable of storing data in digital computer readable form. The processors 14 and the memory 16 may be situated within a single computing node (e.g., as part of a single-node SMP system) or they may be distributed over plural nodes (e.g., as part of a NUMA system or cluster). Other distributed topologies could also be employed. Conventional cache memories (not shown) may also be respectively associated with the processors 14.

Additional components of the computing system 12 may include a display adapter 18 for generating visual output information (e.g., text and/or graphics) to a display device. A persistent storage device 20 (e.g., a disk drive, a flash memory drive, or any other device capable of persistently storing data in digital computer readable form) may also be provided. The computing system 12 may also include various peripheral devices 22 that may include a keyboard or keypad input device, a pointer input device, a network interface card (NIC), a USB bus controller, a SCSI disk controller, etc. A bus or other communication infrastructure 24, which may include a memory controller hub or chip 26 (e.g., a northbridge) and an I/O (input/output) controller hub or chip 27 (e.g., a southbridge), may be used to interconnect the foregoing elements. It should be understood that the foregoing description is for purposes of illustration only, and that other components and arrangements may also be used to implement the internals of the computing system 12.

The program logic including the conversation advisor 10 may be variously implemented in software, firmware, hardware or any combination thereof. If implemented in software, the conversation advisor 10 may be loaded from the persistent storage 20 into a portion of the main memory 16 that includes RAM. If implemented in firmware, the conversation advisor 10 could reside in a portion of the main memory 16 that includes ROM, such as EPROM memory.

As mentioned, some embodiments of the conversation advisor 10 could be implemented using dedicated logic hardware. Examples of such hardware would include connected logic units such as gates and flip-flops, and/or integrated devices, such as application specific integrated circuits (ASICs) and programmable gate arrays (e.g., field programmable gate arrays (FPGAs)) or processors. In some embodiments, such hardware units might be used in lieu of the processors 14, the memory 16 and other components of the computing system 12, i.e., in a particular machine having dedicated logic circuits.

If the conversation advisor 10 is implemented in software, the persistent storage device 20 may store a copy of the conversation advisor so as to preserve it during times when the program, or the computing system 12 itself, is not in operation. The persistent storage device 20 may also store a set of one or more electronic message applications 28. Assuming the electronic message applications 28 are implemented in software, during operation of the computing system 12, any given electronic message application(s) 28 may be loaded into the memory 16 for execution by the processor(s) 14. This is shown in FIG. 2.

Figure 3:
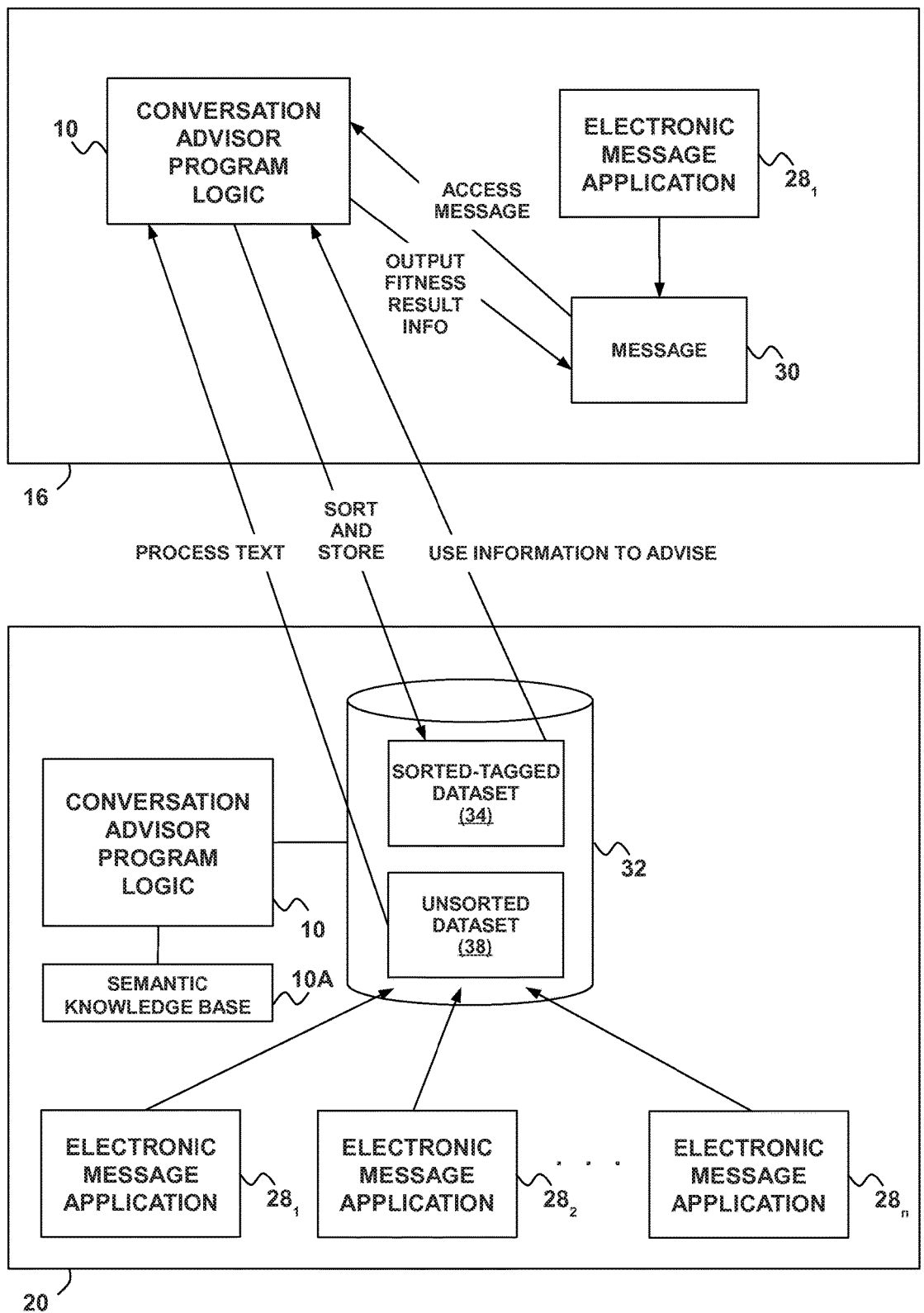
FIG. 3 is a functional block diagram showing example program and database components that may be implemented by the computer system of FIG. 2.

Turning now to FIG. 3, an example state of the computing system 12 is shown in which one of the electronic message applications 28 (designated by reference number 28₁) has been invoked by a message author (not shown) in order to create an electronic message 30 to be sent to one of the electronic message recipient systems 6. In this example, functional elements of the electronic message application 28₁ have been loaded from the persistent storage device 20 and stored in the main memory 16, as have functional elements of the conversation advisor 10. The message 30 being authored may also be stored in the main memory 16, e.g., as an open file. Additional aspects of FIG. 3 will be described in more detail below following the discussion of FIG. 4.

Figure 4:
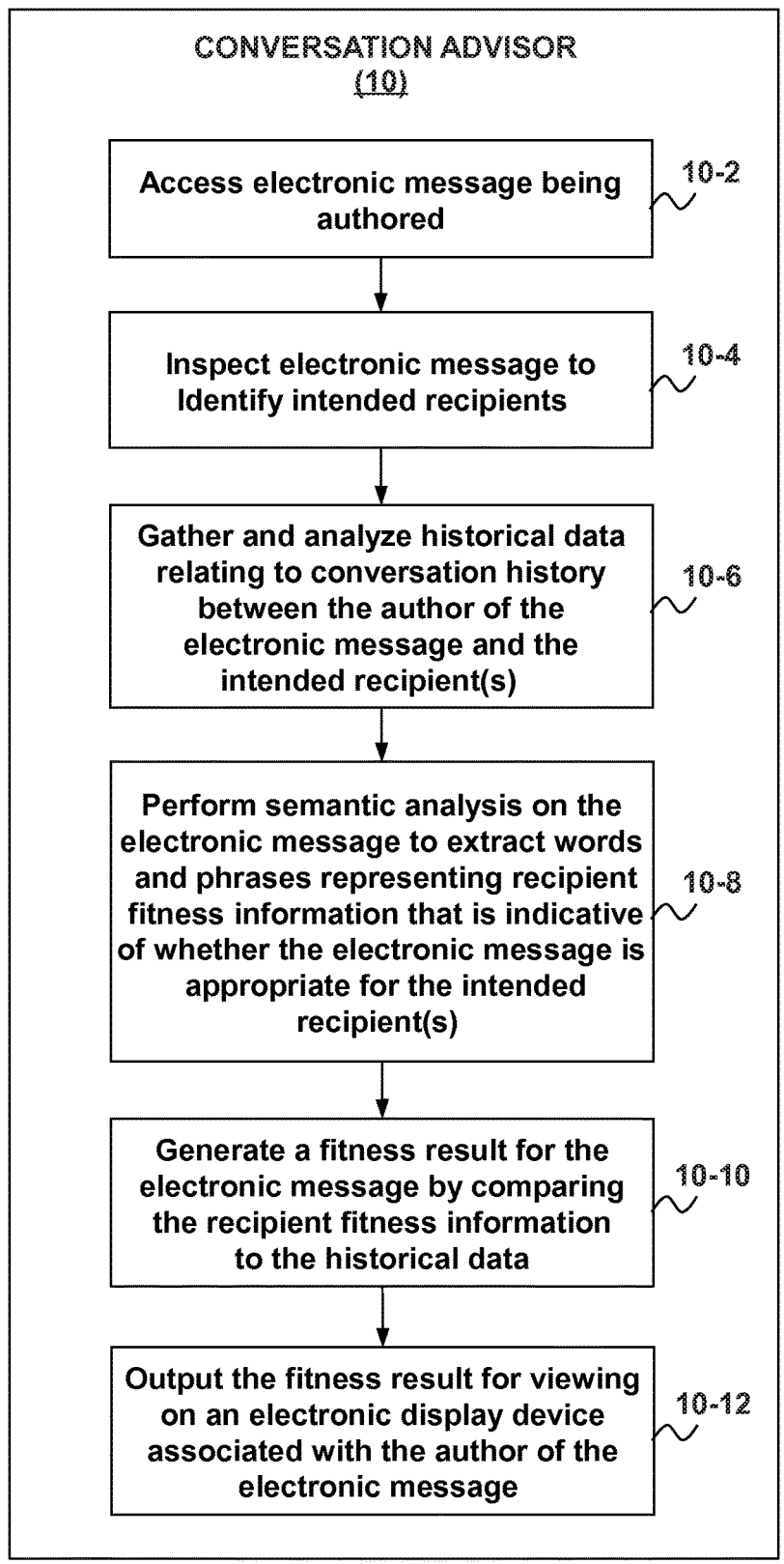
FIG. 4 is a flow diagram illustrating example computer-implemented logic for assisting the authoring of electronic messages.

Turning now to FIG. 4, example operations of the conversation advisor 10 for assisting the authoring of an electronic message are shown. In this example, the computing system 12 is in the state shown in FIG. 3. The conversation advisor 10 and the electronic message application 28₁ are operational, and the electronic message application is being used to author the electronic message 30.

In block 10-2 of FIG. 4, the conversation advisor 10 is invoked and accesses the electronic message 30 in the memory 16 (e.g., by performing a file-read operation). The conversation advisor 10 may be invoked in any suitable manner. One approach would be to invoke the conversation advisor 10 in response to the electronic message author performing an input action associated with the electronic message application 28 being used to author the electronic message 30. For example, the conversation advisor 10 could be invoked when the author attempts to initiate a message transmit operation (e.g., by clicking on a "send" button). Transmission of the electronic message would then be delayed until the conversation advisor 10 completes its authoring assistance operations. Another approach would be to invoke the conversation advisor 10 in response to the author activating a specific user interface component, such as a dedicated "conversation advisor" button. This would be similar to invoking a spell checker in an email program. The conversation advisor 10 could be invoked at any time during authoring of the electronic message 30. If desired, the conversation advisor 10 could run continuously during electronic message authoring in order to highlight potential problems in real time. In that case, the conversation advisor 10 could be invoked in response to the author's invocation of the electronic message application 28₁.

In block 10-4 of FIG. 4, the conversation advisor 10 inspects the electronic message to identify its intended recipients. For example, if the electronic message application 28₁ is an email client, the conversation advisor 10 may check the "To:", "Cc:" and "Bcc:" email message header fields. If the electronic message application 28₁ is a chat or social media application, recipient names may be obtained via email address, defined chat nickname, mapping of chat nickname to user email address from the user record in the chat application, or verified social media account.

In block 10-6 of FIG. 4, the conversation advisor 10 gathers and analyzes historical data stored in the persistent storage device 20 relating to a conversation history that links the author of the electronic message to each intended recipient. The goal is to determine from previous conversations what styles and guidelines have been used in the past to converse with the recipient(s) via one or more different electronic message applications. Details as to how such historical data may be gathered and analyzed are described below in connection with FIGS. 3 and 5.

In block 10-8 of FIG. 4, the conversation advisor 10 performs semantic analysis of the electronic message 30 to extract words and phrases representing recipient fitness information that is indicative of whether the electronic message is appropriate for the intended recipient(s). Categories of words and phrases representing recipient fitness information, and/or rules for identifying such words and phrases, can be maintained by the conversation advisor 10 in a semantic analysis knowledge base 10A (see FIG. 3). Such categories may include, but are not limited to, the following:

(1) words or phrases indicating a tone of the electronic message that reflects whether the electronic message is directed to a single recipient or a group of recipients;

(2) words or phrases indicating a manner in which the intended recipients are addressed in a recipient salutation (e.g., formal vs. casual);

(3) words or phrases representing proper names, nicknames and genders associated with the intended recipients (the latter including gender specific pronouns and nouns); and (4) words or phrases indicating a level of formality of the electronic message as a whole (including slang language and colloquialisms).

In block 10-10 of FIG. 4, the conversation advisor 10 generates a fitness result for the electronic message 30 by comparing the recipient fitness information to the historical data determined in block 10-6. The fitness result may take various forms, including but not limited to an identification of each word or phrase representing the recipient fitness information that is inconsistent with the historical data. The fitness result may also include a suggested alternative word or phrase that is consistent with the historical data.

In block 10-12 of FIG. 4, the conversation advisor outputs the fitness result for viewing on an electronic display device associated with the author of the electronic message 30. In the example of FIG. 3 where the electronic message 30 is being authored on the computing system 12, the display device driven by the display adapter 18 would typically be used. For the convenience of the author, the fitness result may be output for display within the electronic message itself, for example, by highlighting each inconsistent word or phrase, and suggesting an alternative word or phrase. The fitness result output would thus include advice to the author of the electronic message concerning how to correct instances where the recipient fitness information is inconsistent with the intended recipient. These suggestions will constitute a warning with specific guidelines that need to be followed in the electronic message for a particular recipient or group of recipients.

In an embodiment, the author of the electronic message 30 could be given an opportunity to accept or reject the advice given in the fitness result. The author's rejection would constitute an input to the conversation advisor 10 indicating that the advice in the fitness result output is incorrect relative to an instance wherein the recipient fitness information is inconsistent with an intended recipient. The conversation advisor 10 could be implemented to respond to such input by updating the historical data for the recipient to specify that this particular word or phrase of the recipient fitness information is in fact appropriate for this recipient. Thus, the conversation advisor 10 includes a learning capability responsive to corrections supplied by the author of the electronic message 30.

Figures 5, 6:
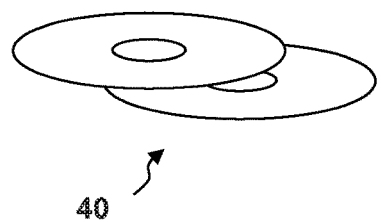
FIG. 5 is a diagrammatic illustration of a database entry for use in assisting the authoring of electronic messages.
FIG. 6 is a diagrammatic illustration showing example computer-readable storage media that may be used to provide one embodiment of a computer program product for assisting the authoring of electronic messages.

Turning now to FIGS. 3 and 5, an example technique for implementing the historical data gathering and analysis of block 10-6 of FIG. 4 will now be described. As shown in FIG. 3, the conversation advisor 10 may be implemented in an example embodiment to maintain a database 32 in the persistent storage device 20 of the computing system 12. The database 32 is used for storing historical data relating to conversation histories that link particular authors of electronic messages to electronic message recipients that the authors have conversed with in the past. According to such an embodiment, the database 32 maintains a sorted/tagged dataset 34 including sorted and tagged data extracted from previous electronic messages created by the various electronic message applications 28. The sorted/tagged data in the dataset 34 may be arranged in individual database entries that are each specific to a particular recipient that a particular electronic message author has communicated with in the past. Database entries for recipient groups having more than one recipient could also be maintained.

Turning now to FIG. 5, an example database entry 36 is shown. It pertains to an electronic message recipient named "Susan" that the author of the electronic message 30 has conversed with in the past using one or more of the electronic message applications 28. The database entry 36 includes a set of key-value pairs that correspond to various types of historical data. A first key-value pair 36-2 includes a unique number (e.g., "1022") for this particular recipient. This key-value pair is used to uniquely identify the recipient relative to other recipients that the author of the electronic message 30 may have corresponded with in the past. An email address could be also be used in lieu of a unique number, provided it is unique. If the author of the electronic message 30 uses multiple email addresses to consult with this recipient (e.g., one for personal, one for professional), a unique numerical value may be a better choice.

A second key-value pair 36-4 includes the recipient's full name. This key-value pair may be used to ensure that the electronic message 30 uses the recipient's correct name. This is important when analyzing the electronic message 30 for (1) words or phrases indicating a manner in which the intended recipient is addressed in a recipient salutation, (2) words or phrases representing proper names associated with the intended recipient, and (3) words or phrases indicating a level of formality of the electronic message. By way of example, if the recipient's name is misspelled, this information may be used to advise the author of the electronic message of the proper spelling.

A third key-value pair 36-6 includes the recipient's email address, or plural email addresses if there are more than one. This key-value pair may be used to ensure that if the electronic message 30 identifies the recipient using an email address (either in a message header or in the message body), the email address is correct. The domain name in the email address may also be used for assessing access rights to confidential information within the electronic message 30.

A fourth key-value pair 36-8 includes a list of appropriate/preferred nicknames for this recipient. This key-value pair may be used to ensure that the electronic message 30 does not include any inappropriate names for the recipient. This is important when analyzing the electronic message 30 for (1) words or phrases indicating a manner in which the intended recipient is addressed in a recipient salutation, (2) words or phrases representing nicknames associated with the intended recipient, and (3) words or phrases indicating a level of formality of the electronic message. If desired, the nicknames could be ranked according to the way they are listed in the database entry 36. The most commonly used nickname could be listed first, the next most commonly used nickname could be listed second, and so on. By ranking the nicknames in this manner, a suggestion could be made to the author of the electronic message 30 if, for example, a rarely-used nickname appears in the message.

A fifth key-value pair 36-10 includes the gender of the recipient. This key-value pair may be used to ensure that the electronic message 30 does not use any improper gender-specific pronouns or nouns in association with the intended recipient. This is important when analyzing the electronic message 30 for (1) words or phrases indicating a manner in which the intended recipient is addressed in a recipient salutation, and (2) words or phrases representing the gender associated with the intended recipient. For example, proper usage of he/she may be checked using this information.

A sixth key-value pair 36-12 includes the number of previous connections that have been made between the author of the electronic message 30 and the intended recipient. This key-value pair may be used to gauge the accuracy of any suggested changes. A longer history and more connection data allows for more accurate advice/suggestions.

A seventh key-value pair 36-14 includes an identification of the company that employs the intended recipient, and an eighth key-value pair 36-16 includes an identification of the recipient's work position (or job title). These key-value pairs may be used for various purposes, including to assess confidential information within the electronic message 30. For example, if the electronic message 30 contains a confidentiality designation for the recipient's employer, it is likely that the recipient may receive company-confidential information. If the recipient is not an employee of that company, it is likely that the recipient is not allowed to receive company-confidential information, and the author of the electronic message 30 may be so advised. This information is particularly useful when the electronic message 30 is being prepared for multiple recipients. If the electronic message contains company-confidential information for a particular company, and one or more of the intended recipients is not an employee of that company (as determined by their key-value pair 36-14), the author of the electronic message can be so advised. The same processing could be used if the electronic message 30 contains confidential information for a particular work group within a company. By checking each recipient's key-value pair 36-16, the conversation advisor 10 can advise the author of the electronic message of any security issues.

An ninth key-value pair 36-18 includes an identification of the relationship(s) between the author of the electronic message 30 and the intended recipient. This key-value pair may be used to ensure that the electronic message does not contain language that is inappropriate relative to the listed relationship (types). This is important when analyzing the electronic message 30 for (1) words or phrases indicating a manner in which the intended recipient is addressed in a recipient salutation, (2) words or phrases representing nicknames associated with the intended recipient, and (3) words or phrases indicating a level of formality of the electronic message. For example, if the intended recipient has only a formal relationship with the author of the electronic message 30, a salutation of Mr. or Ms. followed by a surname would probably be appropriate, whereas a salutation containing a first name or a nickname may not be. Other words and phrases in the electronic message 30 may also be checked and flagged as inconsistent with a formal relationship, such as slang language, colloquialisms, etc. On the other hand, if the relationship is informal, the author of the electronic message 30 may be given more latitude to express his/her ideas and feelings. In that case, the conversation advisor 10 may not need to restrict the language.

In cases where there are several intended recipients of the electronic message 30, the conversation advisor 10 can gauge the formality of the message according to the highest level of formality relationship between the author and any of the intended recipients. For example, if the author has an informal relationship with one group recipient member but a formal relationship with another group recipient member, stricter language may be enforced to ensure the message is appropriate for all recipients. In the group message scenario, the recipient salutation may also be checked to make sure it is consistent with the fact that there are plural recipients. A salutation that identifies less than all the recipients may be flagged for correction, whereas a salutation that includes all recipients, or addresses the recipients as a collective group (e.g. "Hello All") may be deemed appropriate.

The sorted/tagged dataset 34 including the database entries 36 can be created in various ways. According to an example embodiment, the conversation advisor 10 may be periodically invoked (e.g., as a daemon, a cron job, a batch process, etc.) to search for new electronic messages created by the electronic message applications 28. Such electronic messages could be maintained by the computing system 12 in the persistent storage device 20. Alternatively, the electronic messages might be stored on one or more remote servers associated with the electronic message applications 28. As each new electronic message is found, it may be processed by the conversation advisor 10 in a text processing operation (see FIG. 3) to extract the desired data and store it in an unsorted dataset 38. The unsorted dataset 38 may include a portion of the database 32. The conversation advisor 10 then performs a sort and store operation (see FIG. 3) to update existing database entries 36 in the sorted-tagged dataset 34, or to create new database entries, as appropriate. For example, the processing of a particular electronic message will typically extract relevant data for each recipient, and the database entries 36 for those recipients can be updated (particularly the key-value pair 36-12 identifying the number of connections made). If a particular electronic message involves a previously unidentified recipient, a new database entry 36 can be created for that recipient. Note that for any newly created database entry 36, the conversation advisor 10 may fill in the various key-value pairs intuitively based on analysis of all electronic messages involving that recipient. Alternatively, or in addition, the electronic message author associated with the computing system 12 could be prompted to add certain key-value information.

Accordingly, a technique for assisting the authoring of electronic messages has been disclosed. It will be appreciated that the foregoing concepts may be variously embodied in any of a machine-implemented method, a computing system, and a computer program product in which programming logic is provided by one or more computer-readable storage media for use in controlling a computing system to perform the required functions. Example embodiments of a machine-implemented method were previously described in connection with FIGS. 4 and 5.

The computer program product may include a computer readable storage medium (or media) having computer readable program code thereon for causing a processor to carry out aspects of the present invention. Example data storage media for storing such program code are shown by reference numerals 16 (main memory) and 20 (persistent storage) of the computing system 12 of FIG. 2. The computing system 12 could also store information on one or more remote servers (not shown), which would also include a computer readable storage medium for storing program code as described herein. A further example of a computer readable storage medium that may be used to store the program code would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 40 in FIG. 6.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A machine-implemented method for assisting the authoring of electronic messages, comprising:
    invoking machine-implemented electronic messaging logic, said electronic messaging logic including user-interface object logic operable to display a user-interface object and invoke machine-implemented conversation advisor logic in response to user activation of said user-interface logic;
    initiating the creation of an electronic message using said electronic messaging logic, said electronic message being stored in digital form in a computer memory;
    invoking said conversation advisor logic in response to activation of said user-interface logic by an author of said electronic message;
    said conversation advisor logic accessing said electronic message in said computer memory;
    said conversation advisor logic inspecting one or more fields of said electronic message to identify intended recipients of said electronic message;
    said conversation advisor logic gathering and analyzing historical data relating to a conversation history in one or more previous electronic messages that link said author of said electronic message to said intended recipients, said gathering and analyzing of historical data including extracting and storing message content from said one or more previous electronic messages that is indicative of historical semantic styles and guidelines have been used in the past by said author to converse with said intended recipients via one or more electronic message applications;
    said conversation advisor logic sorting, tagging and storing said message content in a computer database as a sorted/tagged dataset that represents said historical data, said historical data being arranged in individual database entries that are each specific to a particular one of said intended recipients or to said intended recipients as a group;
    said conversation advisor logic being operable to populate some or all of said sorted/tagged dataset with data entries containing said historical data in advance of said electronic message being created by periodically searching for new electronic messages created by said electronic messaging logic and extracting said message content therefrom;
    said conversation advisor logic being operable to supplement said sorted/tagged dataset with one or more additional database entries during creation of said electronic message to account for any of said intended recipients who are not represented by existing database entries in said sorted/tagged dataset;
    said conversation advisor logic performing semantic analysis on said electronic message to extract words and phrases representing recipient fitness information that is indicative of whether said electronic message is appropriate for said intended recipients by virtue of being consistent with said historical data;
    said conversation advisor logic generating a fitness result for said electronic message by comparing said recipient fitness information to said historical data and identifying inconsistencies between said words and phrases represented by said recipient fitness information and said historical semantic styles and guidelines represented by said historical data; and said conversation advisor logic outputting said fitness result for viewing on an electronic display device associated with said author of said electronic message.

2. The method of claim 1, wherein said recipient fitness information comprises words or phrases indicating a tone of said electronic message that reflects whether said electronic message is directed to a single recipient or a group of recipients, and if said electronic message is directed to a group of recipients, generating a fitness result that is conservative by ensuring that said electronic message is appropriate for all of said recipients.

3. The method of claim 1, wherein said recipient fitness information comprises words or phrases indicating a manner in which said intended recipients are addressed in a recipient salutation.

4. The method of claim 1, wherein said recipient fitness information comprises words or phrases representing proper names, nicknames and genders associated with said intended recipients.

5. The method of claim 1, wherein said recipient fitness information comprises words or phrases indicating a level of formality of said electronic message.

6. The method of claim 1, wherein said fitness result output comprises advice to said author of said electronic message concerning instances wherein said recipient fitness information is inconsistent with said intended recipients.

7. The method of claim 6, further including said conversation advisor logic receiving an input indicating that said advice in said fitness result output is incorrect relative to an instance wherein said recipient fitness information is inconsistent with said intended recipients, and updating said historical data based on said input to specify that said recipient fitness information is consistent with said intended recipients.

8. A system, comprising:

one or more processors;

a memory operatively coupled to said one or more processors;

program instructions stored in said memory, said program instructions being executable by said one or more processors to perform operations for assisting the authoring of electronic messages, said operations comprising:

invoking machine-implemented electronic messaging logic, said electronic messaging logic including user-interface object logic operable to display a user-interface object and invoke machine-implemented conversation advisor logic in response to user activation of said user-interface logic;

initiating the creation of an electronic message using said electronic messaging logic, said electronic message being stored in digital form in a computer memory;

invoking said conversation advisor logic in response to activation of said user-interface logic by an author of said electronic message;

said conversation advisor logic accessing said electronic message in said computer memory;

said conversation advisor logic inspecting one or more fields of said electronic message to identify intended recipients of said electronic message;

said conversation advisor logic gathering and analyzing historical data relating to a conversation history in one or more previous electronic messages that links said author of said electronic message to said intended recipients, said gathering and analyzing of historical data including extracting and storing message content from said one or more previous electronic messages that is indicative of historical semantic styles and guidelines have been used in the past by said author to converse with said intended recipients via one or more electronic message applications;

said conversation advisor logic sorting, tagging and storing said message content in a computer database as a sorted/tagged dataset that represents said historical data, said historical data being arranged in individual database entries that are each specific to a particular one of said intended recipients or to said intended recipients as a group;

said conversation advisor logic being operable to populate some or all of said sorted/tagged dataset with data entries containing said historical data in advance of said electronic message being created by periodically searching for new electronic messages created by said electronic messaging logic and extracting said message content therefrom;

said conversation advisor logic being operable to supplement said sorted/tagged dataset with one or more additional database entries during creation of said electronic message to account for any of said intended recipients who are not represented by existing database entries in said sorted/tagged dataset;

said conversation advisor logic performing semantic analysis on said electronic message to extract words and phrases representing recipient fitness information that is indicative of whether said electronic message is appropriate for said intended recipients by virtue of being inconsistent with said historical data;

said conversation advisor logic generating a fitness result for said electronic message by comparing said recipient fitness information to said historical data and identifying inconsistencies between said words and phrases represented by said recipient fitness information and said historical semantic styles and guidelines represented by said historical data; and said conversation advisor logic outputting said fitness result for viewing on an electronic display device associated with said author of said electronic message.

9. The system of claim 8, wherein said recipient fitness information comprises words or phrases indicating a tone of said electronic message that reflects whether said electronic message is directed to a single recipient or a group of recipients, and if said electronic message is directed to a group of recipients, generating a fitness result that is conservative by ensuring that said electronic message is appropriate for all of said recipients.

10. The system of claim 8, wherein said recipient fitness information comprises words or phrases indicating a manner in which said intended recipients are addressed in a recipient salutation.

11. The system of claim 8, wherein said recipient fitness information comprises words or phrases representing proper names, nicknames and genders associated with said intended recipients.

12. The system of claim 8, wherein said recipient fitness information comprises words or phrases indicating a level of formality of said electronic message.

13. The system of claim 8, wherein said fitness result output comprises advice to said author of said electronic message concerning instances wherein said recipient fitness information is inconsistent with said intended recipients.

14. The system of claim 13, wherein said operations further include said conversation advisor logic receiving an input indicating that said advice in said fitness result output is incorrect relative to an instance wherein said recipient fitness information is inconsistent with said intended recipients, and updating said historical data based on said input to specify that said recipient fitness information is consistent with said intended recipients.

15. A computer program product, comprising:
one or more computer-readable storage media;
program instructions stored on said one or more media, said program instructions being executable by one or more processors to perform operations for assisting the authoring of electronic messages, said operations comprising:
invoking machine-implemented electronic messaging logic, said electronic messaging logic including user-interface object logic operable to display a user-interface object and invoke machine-implemented conversation advisor logic in response to user activation of said user-interface logic;
initiating the creation of an electronic message using said electronic messaging logic, said electronic message being stored in digital form in a computer memory;
invoking said conversation advisor logic in response to activation of said user-interface logic by an author of said electronic message;
said conversation advisor logic accessing said electronic message in said computer memory;
said conversation advisor logic inspecting one or more fields of said electronic message to identify intended recipients of said electronic message;
said conversation advisor logic gathering and analyzing historical data relating to a conversation history in one or more previous electronic messages that links said author of said electronic message to said intended recipients, said gathering and analyzing of historical data including extracting and storing message content from said one or more previous electronic messages that is indicative of historical semantic styles and guidelines have been used in the past by said author to converse with said intended recipients via one or more electronic message applications;
said conversation advisor logic sorting, tagging and storing said message content in a computer database as a sorted/tagged dataset that represents said historical data, said historical data being arranged in individual database entries that are each specific to a particular one of said intended recipients or to said intended recipients as a group;
said conversation advisor logic being operable to populate some or all of said sorted/tagged dataset with data entries containing said historical data in advance of said electronic message being created by periodically searching for new electronic messages created by said electronic messaging logic and extracting said message content therefrom;
said conversation advisor logic being operable to supplement said sorted/tagged dataset with one or more additional database entries during creation of said electronic message to account for any of said intended recipients who are not represented by existing database entries in said sorted/tagged dataset;
said conversation advisor logic performing semantic analysis on said electronic message to extract words and phrases representing recipient fitness information that is indicative of whether said electronic message is appropriate for said intended recipients by virtue of being consistent with said historical data;
said conversation advisor logic generating a fitness result for said electronic message by comparing said recipient fitness information to said historical data and identifying inconsistencies between said words and phrases represented by said recipient fitness information and said historical semantic styles and guidelines represented by said historical data; and
said conversation advisor logic outputting said fitness result for viewing on an electronic display device associated with said author of said electronic message.

16. The computer program product of claim 15, wherein said recipient fitness information comprises words or phrases indicating a tone of said electronic message that reflects whether said electronic message is directed to a single recipient or a group of recipients, and if said electronic message is directed to a group of recipients, generating a fitness result that is conservative by ensuring that said electronic message is appropriate for all of said recipients.

17. The computer program product of claim 15, wherein said recipient fitness information comprises words or phrases indicating a manner in which said intended recipients are addressed in a recipient salutation.

18. The computer program product of claim 15, wherein said recipient fitness information comprises words or phrases representing proper names, nicknames and genders associated with said intended recipients.

19. The computer program product of claim 15, wherein said recipient fitness information comprises words or phrases indicating a level of formality of said electronic message.

20. The computer program product of claim 15, wherein said fitness result output comprises advice to said author of said electronic message concerning instances wherein said recipient fitness information is inconsistent with said intended recipients; and
wherein said operations further include said conversation advisor logic receiving an input indicating that said advice in said fitness result output is incorrect relative to an instance wherein said recipient fitness information is inconsistent with said intended recipients, and updating said historical data based on said input to specify that said recipient fitness information is consistent with said intended recipients.

* * * * *